J. P. FEENEY.
DYNAMO ELECTRIC MACHINE.
APPLICATION FILED DEC. 29, 1909.

964,770.

Patented July 19, 1910.

Witnesses:
Marcus L. Byng.
J. Ellis Glen.

Inventor:
Joseph P. Feeney
by
His Attorney.

UNITED STATES PATENT OFFICE.

JOSEPH P. FEENEY, OF SCHENECTADY, NEW YORK, ASSIGNOR TO GENERAL ELECTRIC COMPANY, A CORPORATION OF NEW YORK.

DYNAMO-ELECTRIC MACHINE.

964,770.  Specification of Letters Patent.  Patented July 19, 1910.

Original application filed April 6, 1908, Serial No. 425,395. Divided and this application filed December 29, 1909. Serial No. 535,501.

*To all whom it may concern:*

Be it known that I, JOSEPH P. FEENEY, a citizen of the United States, residing at Schenectady, county of Schenectady, State of New York, have invented certain new and useful Improvements in Dynamo-Electric Machines, of which the following is a specification.

The present application is a division of my prior application, Serial No. 425,395, filed April 6, 1908.

My invention relates to dynamo-electric machines and more particularly to means for supporting the end turns or connections which extend beyond the cores of the rotors of such machines, and has for its object a simple arrangement whereby such end turns may be rigidly secured in place against the action of centrifugal force and at the same time are well ventilated.

Heretofore in constructing the supports for end turns of the rotors of high speed dynamo-electric machines it has been found necessary to hold the end turns between plates or rings of metal. These rings form pockets preventing circulation of air past the coils so that the heat generated in the coils is retained. By employing supports according to my invention the end turns are efficiently ventilated and no such pockets are formed. To this end, I provide a supporting member having members mounted thereon against which the end turns are clamped and means for holding said end turns in place against centrifugal force comprising members having portions interlocking with said members mounted on the supporting member.

Other features of novelty which characterize my invention are pointed out with particularity in the claims annexed to and forming a part of this specification. For a better understanding of my invention, however, reference may be had to the following description taken in connection with the accompanying drawing, in which—

Figure 3:
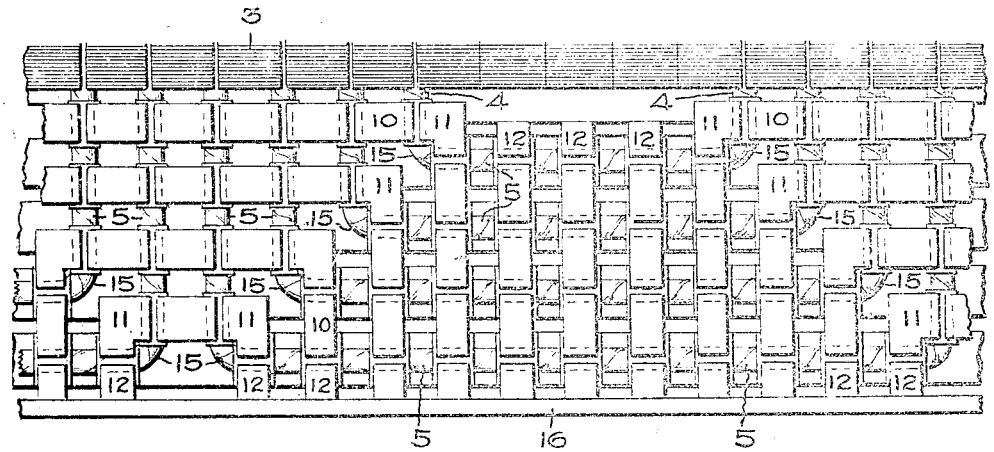
Figure 1:
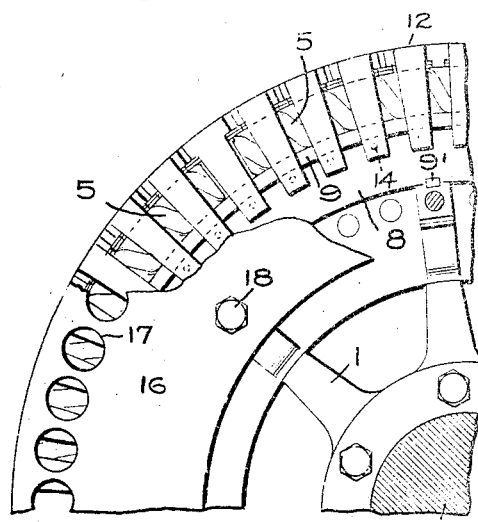
Figure 2:
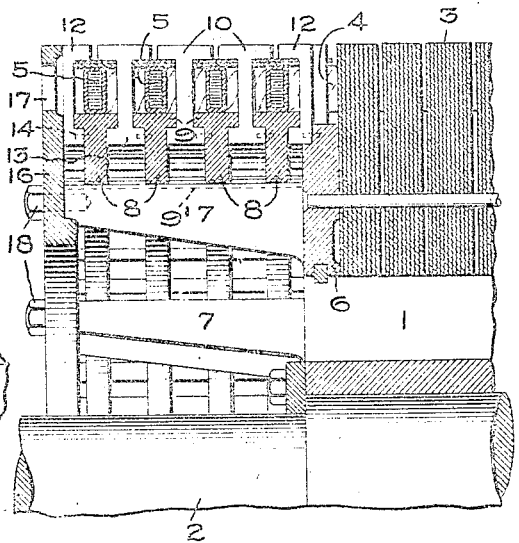

Figure 1 is an end view of a portion of the rotor of a dynamo-electric machine embodying my invention, with parts broken away: Fig. 2 is a sectional view of the rotor of Fig. 1; and Fig. 3 is a plan view of the end turns of the rotor of Fig. 1.

The spider 1 is mounted upon the shaft 2 and supports the laminations 3. The coils 4 are embedded in slots in the laminations and have the end turns or connections 5. These parts may assume any usual or preferred form.

The end member 6 carries arms 7 upon which are mounted supporting members 8 against which the end turns 5 are clamped. I have shown the supporting members 8 as rings having flanged portions 9. The arms 7 and rings 8 are keyed together by means of keys 9' to prevent the rings 8 from rotating relatively to the arms. The end turns are held in place against centrifugal force by means of members 10, 11 and 12 having flanged portions 13 interlocking with the flanged portions 9 on the rings 8. The members 10, 11 and 12, as shown in the drawing, may have overhanging portions which engage the exterior of the end connections of the coils. These members have stem portions which pass between the coils and are suitably spaced apart by means of dowel pins 14 which also keep them from moving when properly spaced. By thus spacing the members 10, 11 and 12 apart, passages are provided so that air may pass between these members and the rings 8 and thereby keep the end turns cool. The overhanging portions of the members 10 engage the exterior surface of two adjacent coils, and consequently they are T-shaped. The members 11 engage the corners 15 of each end turn. The members 12 are L-shaped, the overhanging portions of which engage the extreme outer and inner end turns. An end ring 16 provided with ventilating holes 17 is fastened to the arms 7 by means of bolts 18. This end ring presses against the members 12 which engage the outer end turns, and thereby holds the entire supporting means rigidly in place.

I desire it to be understood that my invention is not limited to the particular construction shown and described, and I aim in the appended claims to cover all modifications which do not depart from the spirit of my invention.

What I claim as new and desire to secure by Letters Patent of the United States, is,—

1. In a dynamo-electric machine, a rotatable member, coils therefor having end turns or connections, a supporting member having members mounted thereon against which said end turns are clamped, and means for holding said end turns in place against centrifugal force comprising members having portions interlocking with said members mounted on the supporting member.

2. In a dynamo-electric machine, a rotatable member, coils therefor having end turns or connections, a supporting member, rings mounted on said supporting member against which said end turns are clamped, and means for holding said end turns in place against centrifugal force comprising members having portions interlocking with said rings.

3. In a dynamo-electric machine, a rotatable member, coils therefor having end turns or connections, a supporting member having arms, rings supported on said arms against which said end members are clamped, and means for holding said end turns in place against centrifugal force comprising members having portions interlocking with said rings.

4. In a dynamo electric machine, a rotatable member, coils therefor having end turns or connections, a supporting member having members mounted thereon against which said end turns are clamped, and means for holding said end turns in place against centrifugal force comprising members having stem portions passing between the end turns and portions interlocking with said members mounted on the supporting member.

5. In a dynamo-electric machine, a rotatable member, coils therefor having end turns or connections, a supporting member having members mounted thereon against which said end turns are clamped, and means for holding said end turns in place against centrifugal force comprising members having flanged portions engaging the exterior surface of said end turns, stem portions passing between said end turns and portions interlocking with said members mounted on the supporting member.

6. In a dynamo-electric machine, a rotatable member, coils therefor having end turns or connections, a supporting member, rings mounted on said supporting member against which said end turns are clamped, and means for holding said end turns in place against centrifugal force comprising members having stem portions passing between said end turns and portions interlocking with said rings.

7. In a dynamo-electric machine, a rotatable member, coils therefor having end turns or connections, a supporting member, rings mounted on said supporting member against which said end turns are clamped, and means for holding said end turns in place against centrifugal force comprising members having flanged portions engaging the exterior surface of said end turns, stem portions passing between the end turns and portions interlocking with said rings.

8. In a dynamo-electric machine, a rotatable member, coils therefor having end turns or connections, a supporting member having arms, rings supported on said arms against which said end turns are clamped, and means for holding said end turns in place against centrifugal force comprising members having flanged portions engaging the exterior surface of said end turns, stem portions passing between the end turns and portions interlocking with said rings.

In witness whereof, I have hereunto set my hand this 27th day of December, 1909.

JOSEPH P. FEENEY.

Witnesses:
BENJAMIN B. HULL,
HELEN ORFORD.